Figure 1:
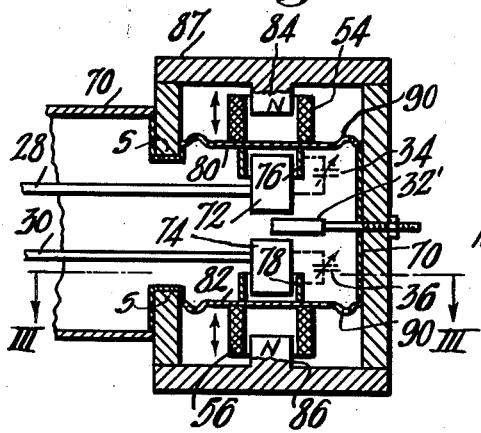

March 11, 1952  H. KIHN  2,589,091

MECHANICAL MODULATOR

Filed Oct. 15, 1948  2 SHEETS—SHEET 1

INVENTOR
Harry Kihn
BY
ATTORNEY

March 11, 1952 — H. KIHN — 2,589,091
MECHANICAL MODULATOR
Filed Oct. 15, 1948 — 2 SHEETS—SHEET 2

INVENTOR
*Harry Kihn*
BY
ATTORNEY

Patented Mar. 11, 1952

2,589,091

UNITED STATES PATENT OFFICE 2,589,091

MECHANICAL MODULATOR

Harry Kihn, Lawrenceville, N. J., assignor to Radio Corporation of America, a corporation of Delaware Application October 15, 1948, Serial No. 54,668

13 Claims. (Cl. 332—30)

My invention relates generally to frequency modulation systems, and more particularly to frequency modulation systems in which mechanical modulation devices are employed.

In such systems, the frequency of the generated oscillations is varied by physical displacement of an element in accordance with the modulating wave or oscillation. The movement of the element may be accomplished by purely mechanical means or by a transducer converting electrical energy into mechanical energy which then effects the desired motion of the modulating element.

One such system, for example, utilizes a generator of high frequency oscillations, the frequency determining circuit comprising a resonant transmission line. A metallic diaphragm is capacitively coupled to the line, preferably at a point of high alternating or oscillating voltage, by being closely spaced from the line at the desired point. The diaphragm is connected to a source of fixed potential and moved toward and away from the line to modulate the electrical length thereof and thus the frequency of the generated waves. The modulating motion may be produced by a transducer constructed by mechanically connecting the diaphragm to an armature through which modulating currents pass and part of which surrounds a fixed pole piece with which the magnetic field of the current in the armature reacts to produce the desired modulating motion. Preferably, the frequency shift or variation provided by small motions of the element is comparatively great in order that the system have a comparatively high modulation efficiency, and is as linear as possible considered as a function of the modulating currents.

Such mechanically modulated frequency modulation systems are used extensively in mobile equipment and particularly in airplanes using such systems for altimeters.

A serious defect of such systems arises, particularly when used in airplanes, because the modulating element is subject to spurious motion or displacement by the resultant force due to changing orientation or attitude with respect to the earth's gravitational field, or by sudden acceleration and deceleration of the airplane, or by variations in centrifugal acceleration, or inertial forces, or some combination of these. Because of the motion caused by variations of these forces, the center frequency of the modulated signals is liable to spurious shifts, and moreover, the system may be modulated in an undesired manner, for example, in accordance with vibration of the element, or motion of the airplane or vehicle carrying the system.

It is an object of my invention to provide a frequency modulation system in which frequency shifts from the desired carrier frequency due to the above causes are minimized.

It is a further object of the invention to provide for such a system a modulating structure by which frequency shifts due to undesired motion of a modulating element or elements are compensated.

Another object of the invention is to provide a capacitor the capacity of which is substantially unaffected by these spurious motions and which may nevertheless be suitably modulated.

Another object of the invention is to improve the stability of frequency of a mechanically-modulated frequency modulation system with respect to changes in frequency which may be caused by undesired motion of the mechanical modulating element.

An additional object of the invention is to provide an improved mechanical modulating device or transducer wherein opposing displacements of coacting elements effects desired modulation and wherein similar displacements of said elements due to undesired forces thereon do not cause such modulation.

In accordance with my invention I provide two modulating elements to modulate, by their mechanical displacement, the frequency of the signal generating system, said elements being positioned to be moved towards or away from each other to give the desired modulation, and whereby motion of the two elements in the same direction results in frequency compensation. The invention may be applied to modulate the frequency of both push-pull generators or single ended generators of carrier frequency.

Figure 2:
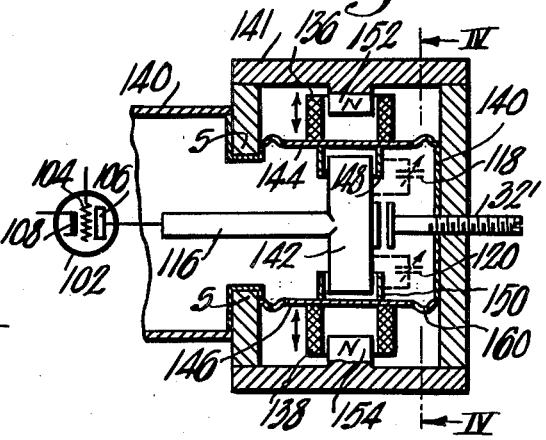
Figure 3:
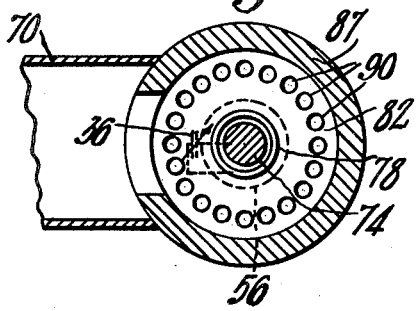
Figure 4:
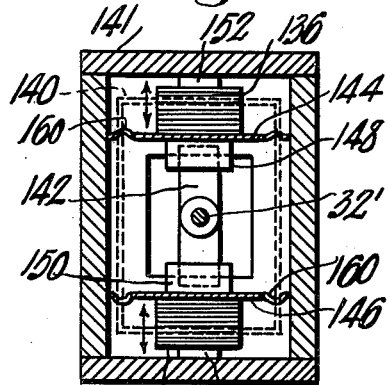
Figure 5:
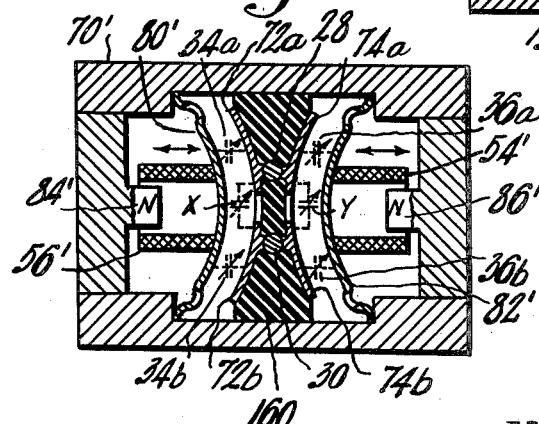
Figure 1A:
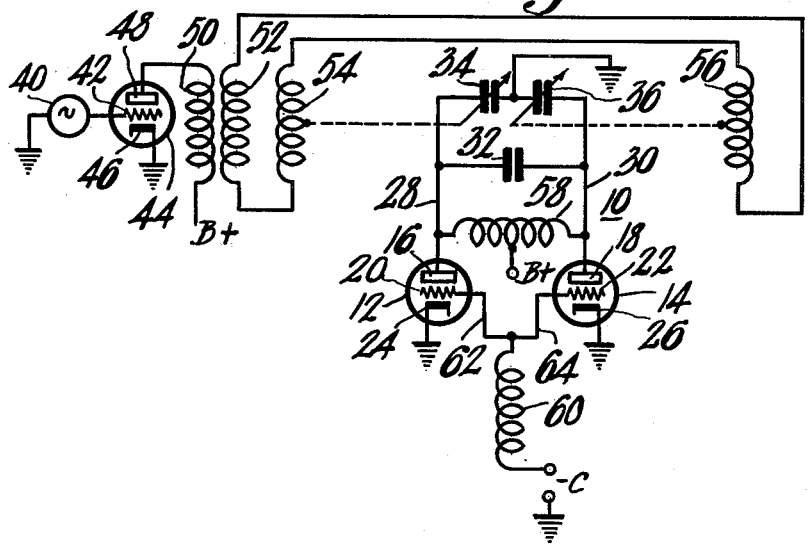
Figure 2A:
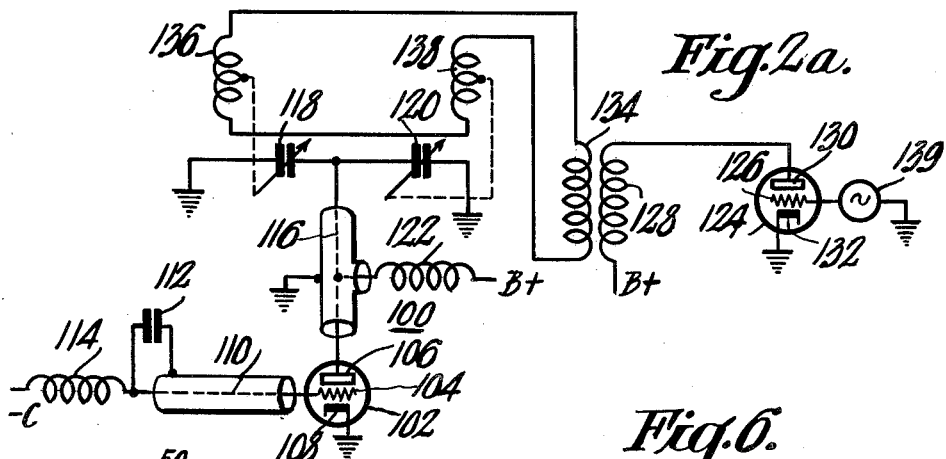

Other objects, advantages and novel features of the invention will become apparent from the following description in which like numerals refer to like parts, and the accompanying drawing:

Fig. 1 is a cross-sectional view of the frequency modulating portion of a frequency modulation system embodying the invention and employing a push-pull high frequency generator;

Fig. 1-a is a schematic electrical circuit diagram of a system embodying the invention and the structure which is illustated in Fig. 1;

Fig. 2 is a sectional view of a portion of a frequency modulation system utilizing a single-sided carrier frequency generator embodying the modulator of the invention;

Fig. 2-a is a schematic electrical circuit diagram of the system partially shown in Fig. 2;

Fig. 3 is a sectional view taken along the lines III—IIII of the portion of the system shown in Fig. 1;

Fig. 4 is a sectional view taken along lines IV—IV of the portion of the system illustrated in Fig. 2; and Fig. 5 is a sectional view of a modification of a portion of a frequency modulation system embodying the invention wherein the modulating structure employs curved modulating diaphragms to form parallel plate capacitors rather than concentric cylinder capacitors and which may be ultilized alternatively in place of the portion of the system shown in Fig. 1.

Figure 6:
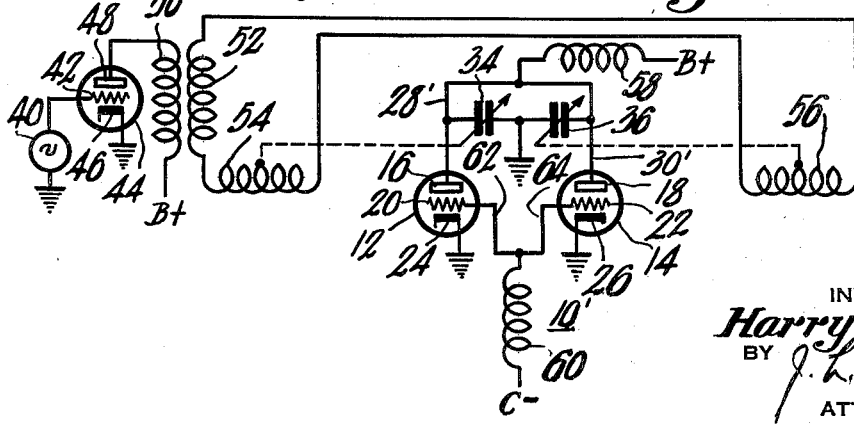

Fig. 6 is a schematic circuit diagram of a modification of the circuit of Fig. 1-a wherein an odd quarter wavelength resonant transmission line is employed.

Referring now more particularly to Figs. 1, 1-a, 1-b, and 3 a radio frequency generator 10, which may be as shown schematically in Fig. 1-a, may be a push-pull generator of a type well known to the art. Generator 10 may be considered as a tuned plate-tuned grid circuit including thermionic tubes 12 and 14 having, respectively, anodes 16 and 18, grids 20 and 22, and cathodes 24 and 26. Cathodes 24 and 26 are grounded. Anodes 16 and 18 are connected respectively to conductive lines 28 and 30. Lines 28 and 30 form a transmission line and are coupled to ground by variable capacities schematically indicated as capacities 34 and 36 respectively in a manner to be more fully explained hereinafter. Thus the transmission line may resonate electrically at an even quarter wave length, say a half wave length long substantially as a transmission line open-circuited at its far end. Capacity 32 is a small trimmer capacity for adjusting to a desired mean frequency. The capacities 34 and 36 are varied in accordance with a source 40 of modulation signals of frequency substantially lower than that generated by generator 10. The source 40 may be fed to the grid 42 by thermionic tube 44 having a grounded cathode 46 and an anode 48 connected to a source of B supplied through an inductor 50 as shown more fully in Fig. 1-a. Inductor 50 is coupled to inductor 52 and induces voltages therein to cause currents to flow in coils 54 and 56 which cause a mechanical motion by interaction with a preferably fixed magnetic field to vary capacities 34 and 36 as will be more fully explained hereinafter. Tubes 12 and 14 may be furnished with a B supply through a center-tapped radio frequency choke coil 58 connected to the anodes 16 and 18 through lines 28 and 30. The choke coil 58 is preferably connected to lines 28 and 30 at a point of low radio frequency voltage. In somewhat similar manner grids 20 and 22 may be supplied with suitable bias, the source thereof indicated as C—, through a choke coil 60 connected to lines 62 and 64 respectively. Lines 62 and 64 are shorted at the ends removed from the grids 20 and 22, to resonate at an odd quarter wave length, being say one quarter wave length long.

A shield 70 (not shown in Fig. 1-a but a portion of which is shown in Fig. 1) of high conductivity may extend around lines 28 and 30 to prevent undesired radiation of the high frequency oscillations generated by generator 10. At the far end of lines 28 and 30, the lines are enlarged to form mallet-heads 72 and 74 respectively. The cylindrical mallet-heads have a common axis so that the two adjacent sides thereof form a capacitor to provide the capacity 32 which may include capacity introduced by tuning screw 32' which is adjustable to adjust capacity 32. The opposite sides of each of mallet-heads 72 and 74 are surrounded, but not contacted, by cylindrical metallic shells 76 and 78 respectively which extend from metallic membranes 80 and 82. Membranes or diaphragms 80 and 82 which extend in a plane normal to the axis common to mallet-heads 72 and 74, are spaced from the mallet-heads and are grounded at the outer periphery. Inductors 54 and 56 are wound about a form to extend about cylindrical magnetic pole pieces 84 and 86 which are part of a magnet 87. Magnet 87 is preferably a permanent magnet which is so magnetized that pole pieces 84 and 86 are both north poles or both south poles. It will be apparent that lines of magnetic flux extend from pole pieces 84 and 86 through the inductors 54 and 56 to be linked by the windings of these inductors. Diaphragms 80 and 82 are attached to shield 70 and effectively form a part thereof. The diaphragms are perforated with apertures 90 to give flexibility in the directions toward and away from mallet-heads 72 and 74, that is, axially thereof, and yet the membranes are subject to practically no motion in their own plane.

In operation lines 28 and 30 act as a tuned transmission line as also do lines 62 and 64 of generator 10 so that the circuit of generator 10 approximates a conventional tuned plate-tuned grid oscillator. Mallet-head 72 and the cylindrical member 76 and membrane or diaphragm 80 provide a capacitor having the capacity 34. The capacity 36 similarly arises from the capacitor formed by mallet-head 74 and diaphragm 82 with cylinder 78 connected thereto. On variation of the capacitors 38 and 48 the electric length of the tuned line 30 varies with a consequent variation of frequency of the high frequency generator 10. The contours of both 76 and 72 and both 78 and 74 may be suitably shaped to produce linear frequency modulation, that is a frequency deviation which varies linearly with driving current through inductors 54 and 56. These capacitors 34 and 36 need not be cylindrical but may assume square, triangular, tapered cones and other geometric contours to obtain any particular law of variation of frequency deviation versus current through inductors 54 and 56 desired. I have found that the coaxial cylinders shown produce substantially linear frequency deviation where the frequency deviation is less than 5 percent of the center frequency. It will be clear that as modulating voltages are applied to grid 42 of modulating tube 44 the currents generated in inductor 50 induce voltages in inductor 52, which in turn cause currents to flow in coils 54 and 56. The latter currents induce magnetic fields which interact with the fixed magnetic field from the permanent magnetic material of which the pole pieces 84 and 86 form a part. Coils 54 and 56 are connected in such a manner that simultaneous currents therein flowing in one direction cause coils 54 and 56 to move toward each other away from pole pieces 84 and 86, thereby moving diaphragms 80 and 82 close to the transmission line element of mallet-heads 72 and 74 to increase capacities 34 and 36 respectively. Similarly when currents in coils 54 and 56 are in the opposite direction the diaphragms move away from each other along the common axis normal to a plane of symmetry of the structure thereby decreasing capacities 34 and 36.

Now assume that some external force such as that due to changed orientation with respect to the earth's gravitational field or that due to sudden acceleration and deceleration of the airplane or by variations in centrifugal acceleration are applied to generator 10. The moveable components of the device which might cause a shift in frequency include the diaphragms 80 and 82. Assuming some flexibility in lines 28 and 30, from the symmetry of the device and the fact that the materials employed will provide no appreciable elongation of the lines, the only force components which might cause frequency shifts are those which may be resolved axially of mallet-heads 72 and 74. As already explained diaphragms 80 and 82 have no appreciable motion in a plane normal to the axis of the mallet-heads. Axial forces then will tend to move the diaphragms in the same direction as opposed to the tendency of the modulating currents to move them in opposite directions toward or from each other along this axis. Accordingly, one of the capacities, say 34, will be increased and the other one will be decreased by the resultant motion. Since these capacities 34 and 36 are effectively at the same electrical point of the tuned line and of the same electrical effect by symmetry considerations, the increase of one and the decrease of the other tend to compensate each other with respect to the resultant frequency changes. That is, the total capacity and electrical length of the line tend to remain substantially constant with variations of forces such as those described.

It is particularly worthy of notice that diaphragms 80 and 82 serve a double purpose in mechanically connecting to the transducer arrangement including coils 54 and 56, and also in shielding the high frequency fields from the magnetic material, which is lossy, and would cause a reduced Q of the resonant transmission line.

Referring now to Figs. 2, 2–a, and 4, these illustrate an embodiment of the invention which may employ a single-ended generator 100 of radio frequency oscillations. Generator 100 comprises a thermionic tube 102 having a grid 104, an anode 106, and a cathode 108. A tuned line 110, which is connected between grid 104 and cathode 108 by capacitor 112, which also blocks grid bias voltage which may be supplied from a C− source as indicated through a radio frequency choke coil 114 connected to line 110 preferably at a point of low radio frequency voltage. A tuned line 116 is connected to anode 106 and is terminated in a capacitive coupling comprising capacities 118 and 120 at its far end from the anode to ground or cathode potential. Generator 100 is supplied with plate supply voltage from a source indicated as B through radio frequency choke coil 122 connected preferably to a point of low radio frequency potential on line 116. A modulator tube 124 has its grid 126 connected to a source of modulating potential 139 and has its cathode 132 grounded. Load inductor 128 is connected to anode 130 which is supplied with voltage from B supply as indicated through inductor 128. Inductor 128 is inductively coupled to inductor 134 to induce voltages therein in response to the signals applied to grid 126. The voltages induced in inductor 134 cause currents to flow in coils 136 and 138. These currents vary the capacities 118 and 120 by a transducer similar to the transducer arrangement illustrated in Fig. 1. A shield 140 surrounds line 116 and acts with line 116 as a coaxial resonant transmission line section terminating in the capacities 118 and 120 between the inner conductor 116 and the grounded cylindrical shells 148 and 150 and a mallet shaped head 142. The faces of mallet-head 142 are closely spaced from membranes or diaphragms 144 and 146 and form capacitors mainly with shells 118 and 120 the capacities of which are respectively capacities 118 and 120. The magnetic yoke 141 of permanent magnetic material which surrounds a portion of shield 140 has cylindrical protuberances 152 and 154 around which coils 136 and 138 respectively extend. The protuberances 152 and 154 are like poles of a magnet, say the north pole as indicated in Fig. 2. Coils 136 and 138 are linked by lines of magnetic force terminating on the pole pieces thus formed. These coils are so connected in circuit that currents flowing there-through as a result of voltages induced in inductor 134 cause coils 136 and 138 to move toward each other when the voltage induced in coil 134 is of one polarity and to move away from each other when such induced voltage is of the opposite polarity. A trimmer 32″ may be used for tuning, similarly to trimmer 32′ of Fig. 1. As will be obvious from what has been said in connection with Fig. 1, such motion toward each other by diaphragms 144 and 146 tends to increase capacities 118 and 120 whereas if the diaphragms move away from each other, capacities 118 and 120 are each decreased. The capacities 118 and 120 are effectively in parallel, in this instance.

The like variation of capacities 118 and 120 with the element of the mallet-head 142 of the tuned circuit causes a variation in the effective length of line 116 by the capacity variation. Furthermore, as already pointed out in connection with Fig. 1, the cup shaped member of the capacitor formed by diaphragm 144 and cylindrical projection 148 with mallet-head 142 is more nearly linear because of the geometric configuration of the capacitor. Again circuit generator 100 is a tuned plate-tuned grid generator, the effective electrical length of the resonant anode circuit being varied by the mechanical modulation resulting in variation of capacities 118 and 120. As before, diaphragms 144 and 146 are apertured near their peripheral edges with apertures 160 to provide additional flexibility of the diaphragms in a direction axial to mallet-head 142. The important compensating effect of the increase of one of capacities 118 and 120 and decrease of the other when the diaphragms move in the same direction under gravitational, inertial, or the like forces, and similar compensation when mallet-head 142 moves under like influences, is apparent from the symmetry of the structure and from what has been said in connection with Fig. 1. The diaphragms again serve a double purpose of mechanical connection and shielding.

Referring now to Fig. 5, the cross sectional view of which is a portion of an embodiment of an invention which may be used in a circuit substantially the same as that of Fig. 1; magnetic yoke 70′ has cylindrical protuberances 84′ and 86′ which are made of permanently magnetized material to provide a magnetic field through coils 54′ and 56′. Diaphragms 80′ and 82′ are mechanically attached to coils 54′ and 56′ in a manner corresponding to that in which diaphragms 80 and 82 of Fig. 1 are attached to coils 54 and 56, and similarly are also part of a shield (not shown). As shown in Fig. 5, the diaphragms 80' and 82' are spherically shaped and are spaced in capacitive relationship with members 72–a and 72–b and members 74–a and 74–b respectively. Members 72–a and 74–a are conductively connected to the termination of line 28 and members 72–b and 74–b are conductively connected to the termination of line 30. Thus the capacity 34 schematically shown in Fig. 1–a may correspond to the capacities 34–a and 34–b of Fig. 5 in parallel and capacity 36 of Fig. 1–a may correspond to capacities 36–a and 36–b of Fig. 5 in parallel. The embodiment illustrated in Fig. 5 is obviously suited, if desired, for utilization in the circuit corresponding to that of Fig. 1–a. The capacity 32 of Fig. 1–a, however, will, if the device of Fig. 5 is used in the circuit of Fig. 1–a, include the capacitors x and 4 in parallel. The coils 54' and 56' are, of course, connected in circuit as are coils 54 and 56 of Fig. 1–a. A low loss solid dielectric 160 may extend between and around line 28—30, the proper choice of which dielectric may aid in mechanical support of the transmission line section 28—30.

The operation of the circuit of Fig. 1–a when employing the embodiment illustrated in Fig. 5, with the differences already explained, will be clear from what has been said hereinabove.

The use of spherically shaped members for the capacitor to form the variable capacity permits this capacity to be made larger for a given space, since the opposed surface areas are larger.

The modulator capacity is placed preferably at a point of high radio frequency potential of the resonant transmission line, which has been shown for convenience at the termination of an open-ended resonant line, but which obviously may be elsewhere than the end in a short-circuited line.

The modulating capacity is preferably connected at a point of high radio frequency potential of the resonant transmission line. Fig. 6 illustrates an arrangement in which a quarter wave-length resonant frequency determinative transmission line is utilized in the anode circuit of the high frequency generator. The anode ends of transmission line comprising conductors 28' and 30' are near points of high radio frequency potential of generator 10'. Therefore, the modulating capacities 34 and 36 are connected at this point of the line as near the anodes as possible. Mallet-heads, such as 72 and 74 may extend from such a point of high radio frequency potential of the conductors 28' and 38'. In other respects the operation of the circuit and its construction will be clear to those skilled in the art from the schematical electrical circuit of Fig. 6 when taken in connection with what has been shown and described hereinbefore.

What I claim is:

1. A modulator for a high frequency generator, comprising a resonant two conductor transmission line substantially symmetrical with respect to a central plane, two movable members each capacitively coupled to said transmission line at a point of high radio frequency potential and substantially symmetrically located with respect to said plane, each of said members being movable along an axis normal to said plane to cause a change in the respective capacity of each said member with said line, and a transducer mechanically connected to and to move said movable members toward and away from each other in response to an electrical modulating signal, whereby said signals modulate the total capacity and the resonant frequency of said line and whereby motion of said movable members in the same direction along said axis as the result of inertial, changed gravitational and the like forces leaves the total capacity with said line substantially unchanged.

2. A modulator for a high frequency generator, including a tuned circuit comprising an element and two members movable with respect to and capacitively coupled to said element, said element being symmetrical with respect to a central plane and said members being substantially symmetrically positioned with respect to said central plane, said movable members being movable along an axis normal to said plane, a pair of coils each mechanically connected to one of said movable members respectively, a pair of pole-pieces each coupled magnetically respectively to one of said coils, said coils being connected in circuit to receive modulating currents in a polarity to move said movable members by the magnetic coupling toward each other when said currents are in one polarity and away from each other when said currents are in the other polarity to change the total capacity of said movable members with said element, whereby motion of said movable members the result of said modulating currents modulates the tuned frequency of said tuned circuit and whereby motion of said movable members in the same direction along said axis as the result of inertial, changed gravitational and the like forces leaves the tuned frequency of said tuned circuit substantially unaffected.

3. A modulator for a high frequency generator, including a tuned circuit comprising a fixed element and two movable members each including a diaphragm capacitively coupled with said fixed member, said element being symmetrical with respect to a central plane and said members being substantially symmetrically positioned with respect to said central plane, said movable members being movable along an axis normal to said plane thereby to vary their capacity with said fixed member, a pair of coils each mechanically connected to one of said movable members respectively, a pair of pole-pieces each coupled magnetically respectively to one of said coils, said coils being connected in circuit to receive modulating currents in a polarity to move said movable members by the magnetic coupling toward each other when said currents are in one polarity and away from each other when said currents are in the other polarity by said magnetic coupling and said mechanical connection thereby with said respective motions to change the total capacity of said movable members with said fixed element whereby motion of said movable members the result of said modulating currents modulates the tuned frequency of said tuned circuit and whereby motion of said movable members in the same direction along said axis as the result of inertial, changed gravitational and the like forces leaves the tuned frequency of said tuned circuit substantially unaffected.

4. A modulator for a high frequency generator, comprising a resonant two conductor transmission line symmetrical with respect to a plane, a transducer arrangement comprising a pair of pole-pieces and a pair of coils inductively coupled each with a respective one of said pole-pieces, a pair of diaphragms symmetrically located with respect to said plane each mechanically coupled to a respective one of said coils and capacitively coupled to a point of high radio frequency potential on a said transmission line, each said diaphragm being between the respective pole piece and the transmission line as an electrical shield to shield the high frequency fields of said transmission line from the material of said pole-pieces, said transducer moving said diaphragms toward each other and away from each other along a common axis normal to said plane to cause a variation in the total capacity with said transmission line in response to modulating signals applied to said transducer, whereby the resonant frequency of said transmission line is modulated in response to said signals and whereby motion of said diaphragms in the same direction along said axis as the result of inertial, changed gravitational and the like forces compensates in the altered capacity of one capacitive coupling for that of the other to leave the resonant frequency of said transmission line substantially unchanged.

5. A modulator for a high frequency generator, comprising a resonant frequency-determinative two conductor transmission line symmetrical with respect to a central plane, each conductor on said line having a mallet-shaped portion each having a common axis normal to said plane, a pair of members symmetrically located with respect to said plane and symmetrical with said axis, said members each being capacitively coupled to one of said mallet-shaped portions respectively, and a modulating transducer mechanically connected to said members to move said members toward each other and away from each other in accordance with a modulating electrical signal to vary the total capacity of said coupling whereby the resonant frequency of said transmission line is modulated in response to said signals and whereby motion of said members in the same direction along said axis as the result of intertial, changed gravitational and the like forces compensates in the capacitive coupling of one of said members for that of the other to leave the resonant frequency of said transmission line substantially unchanged.

6. A modulator for a high frequency generator, comprising a resonant frequency-determinative two conductor transmission line symmetrical with respect to a central plane, each conductor on said line having a mallet-shaped portion each having a common axis normal to said plane, a shield about said line, a pair of members symmetrically located with respect to said plane and symmetrical with said axis and each comprising a diaphragm, said members each being capacitively coupled to one of said mallet-shaped portions respectively, and a modulating transducer including pole pieces to move said members toward each other and away from each other in accordance with a modulating electrical signal to vary the total capacity of said coupling, each said diaphragm being electrically connected to said shield as a part thereof and completing the shielding between said line and said pole pieces, whereby the resonant frequency of said transmission line is modulated in response to said signals and whereby motion of said members in the same direction along said axis as the result of inertial, changed gravitational and the like forces compensates in the capacitive coupling of one of said members for that of the other to leave the resonant frequency of said transmission line substantially unchanged.

7. A modulator for a high frequency generator, comprising a resonant frequency-determinative two conductor transmission line having inner and outer conductors and being substantially symmetrical with respect to a central plane, said inner conductor having a mallet-head portion having an axis normal to said plane, and two members each capacitively coupled respectively to one end of said mallet-head portion and substantially symmetrical with respect to said axis and said plane, and a transducer to move said members toward each other and away from each other along said axis to vary their capacity with said transmission line in response to electrical modulating signals applied to said transducer, whereby the resonant frequency of said transmission line is modulated in response to said signals and whereby motion of said members in the same direction along said axis as the result of inertial, changed gravitational and the like forces compensates in the altered capacity of one capacitive coupling of one member for that of the other to leave the resonant frequency of said transmission line substantially unchanged.

8. A modulator for a high frequency generator, comprising a resonant frequency-determinative two conductor transmission line symmetrical with respect to a central plane, a pair of members symmetrically located with respect to said plane and symmetrical with said axis, said members each comprising spherically curved portions capacitively coupled respectively to complementary conversely curved portions respectively of each conductor of said line, a modulating transducer mechanically connected to said members to move said members toward and away from each other in accordance with a modulating electrical signal to vary the total capacity of said line whereby the resonant frequency of said transmission line is modulated in response to said signals and whereby motion of said members in the same direction along said axis as the result of inertial, changed gravitational and the like forces compensates in the capacitive coupling of one of said members for that of the other to leave the resonant frequency of said transmission line substantially unchanged.

9. A modulator for a high frequency generator, comprising a resonant frequency-determinative two conductor transmission line symmetrical with respect to a central plane, each conductor of said line having a mallet-shaped portion, the said portions having a common axis normal to said plane, a shield about said line, a modulating transducer including a pair of pole pieces and a pair of coils, a pair of diaphragms, and a pair of metallic cylindrical shells, each one of said diaphragms respectively with a respective one of said cylindrical shells forming a cup partially surrounding a respective one of said mallet-shaped portions with said diaphragm interposed between said one portion and a respective one of said pole pieces, a respective one of said coils being mechanically coupled to said one diaphragm and magnetically coupled to said one pole piece, said diaphragms being also electrically connected to said shield to complete the electrical shield between said line and said pole pieces, said transducer coils being electrically connected to move said diaphragms toward each other and away from each other in response to a modulating electrical signal applied to said coils thereby to vary the total capacity of said line, whereby the resonant frequency of said transmission line is modulated in response to said signals and whereby motion of said diaphragms in the same direction along said axis as the result of inertial, changed gravitational and the like forces compensates in the capacitive coupling of one of said cylinders for that of the other to leave the resonant frequency of said transmission line substantially unchanged.

10. A modulator for a high frequency generator, comprising a resonant frequency-determinative two conductor transmission line having inner and outer conductors and being substantially symmetrical with respect to a central plane, said inner conductor having a mallet-head portion having an axis normal to said plane, and a pair of diaphragms, each respectively capacitively coupled to one end of said mallet-head portion, a pair of metallic cylinders each forming with a respective one of said diaphragms a cup partially surrounding the respective end of said mallet-head portion, the cups being substantially symmetrical with respect to said axis and said plane, and a transducer including a pair of pole pieces and a pair of coils each coil magnetically linked respectively by the field of one of said pole pieces, each of said diaphragms being electrically connected to said outer conductor and each interposed respectively between one end of said mallet-head portion and a respective pole piece to serve as a shield, and each of said diaphragms being mechanically connected to a respective one of said coils to move said diaphragms toward and away from each other in response to electrical modulating signals applied to said transducer, whereby said signals modulate the total capacity and the resonant frequency of said line and whereby motion of said movable members in the same direction along said axis as the result of inertial, changed gravitational and the like forces leaves the total capacity of the line substantially unchanged.

11. The modulator claimed in claim 2, said element including a single mallet-head on a conductor.

12. The modulator claimed in claim 2, said element including a pair of mallet-heads symmetrically positioned with respect to said plane.

13. The modulator claimed in claim 3, each said diaphragm being between said element and a respective one of said pole pieces to shield said pole pieces from high frequency currents.

HARRY KIHN.

REFERENCES CITED

The following references are of record in the file of this patent:

UNITED STATES PATENTS

| Number | Name | Date |
|---|---|---|
| 2,386,049 | Hausz | Oct. 2, 1945 |
| 2,429,085 | Albin | Oct. 14, 1947 |
| 2,438,832 | Turner | Mar. 30, 1948 |
| 2,447,492 | Crawley | Aug. 24, 1948 |

FOREIGN PATENTS

| Number | Country | Date |
|---|---|---|
| 586,083 | Germany | Oct. 15, 1933 |